United States Patent
Lynch

(10) Patent No.: US 8,003,928 B1
(45) Date of Patent: Aug. 23, 2011

(54) METHOD FOR COMPENSATING A MILLIMETER WAVE IMAGING ARRAY

(75) Inventor: Jonathan J. Lynch, Oxnard, CA (US)

(73) Assignee: HRL Laboratories, LLC, Malibu, CA (US)

( * ) Notice: Subject to any disclaimer, the term of this patent is extended or adjusted under 35 U.S.C. 154(b) by 429 days.

(21) Appl. No.: 12/336,378

(22) Filed: Dec. 16, 2008

(51) Int. Cl.
*H01L 27/00* (2006.01)
*G01N 21/86* (2006.01)

(52) U.S. Cl. ............................. 250/208.1; 250/559.05

(58) Field of Classification Search .............. 250/208.1, 250/559.04, 559.05, 559.07, 559.1, 214.1, 250/250, 252.1, 330, 338.1, 332; 356/326, 356/213, 218, 222–224, 229, 230; 378/207; 342/22, 179; 374/1, 2
See application file for complete search history.

(56) References Cited

U.S. PATENT DOCUMENTS

| | | | |
|---|---|---|---|
| 6,853,452 B1* | 2/2005 | Laufer | 356/436 |
| 2006/0273255 A1* | 12/2006 | Volkov et al. | 250/336.1 |
| 2009/0020687 A1* | 1/2009 | Lehmann et al. | 250/208.1 |

OTHER PUBLICATIONS

Batelaan, et al., "Improved Noise-Adding Radiometer for Microwave Receivers," NASA Tech Brief, B73-10345, Aug. 1973.
Stelzreid, "Noise Adding Radiometer Performance Analysis," TDA Progress Report 42-59, JPL, pp. 98-106, Jul. and Aug. 1980.
Tiuri, "Radio Astronomy Receivers," IEEE Trans. on Antennas and Propagation, pp. 930-938, Dec. 1964.
Janssen, A., et al., "Direct Imaging of the CMB From Space," Astrophysical journal, 1996, pp. 15.
Kraus, J. D., et al., "Radio Astronomy," Ch. Radio-Telescope Receivers, Mcgraw Hill, NY, 1966, pp. 289-290.
Ulaby, et al., "Microwave Remote Sensing," vol. 1, Artech House, MA, 1981, section 6-9, pp. 369-374.
Ulaby, et al., "Microwave Remote Sensing," vol. 1, Artech House, MA, 1981, section 6-12, pp. 391-392.

* cited by examiner

*Primary Examiner* — Que T Le
*Assistant Examiner* — Pascal M Bui-Pho
(74) *Attorney, Agent, or Firm* — Ladas & Parry

(57) ABSTRACT

A method for compensating a plurality of sensors comprises exposing each of the plurality of sensors to a scene energy from a scene, exposing each of the plurality of sensors to the scene energy from the scene and a reference signal energy, exposing each of the plurality of sensors to a uniform signal energy, exposing each of the plurality of sensors to the uniform signal energy and the reference signal energy, obtaining reference outputs during each exposure of the plurality of sensors, and determining the scene energy received by each of the plurality of sensors relative to the reference signal energy by combining the sensor and reference outputs obtained.

25 Claims, 7 Drawing Sheets

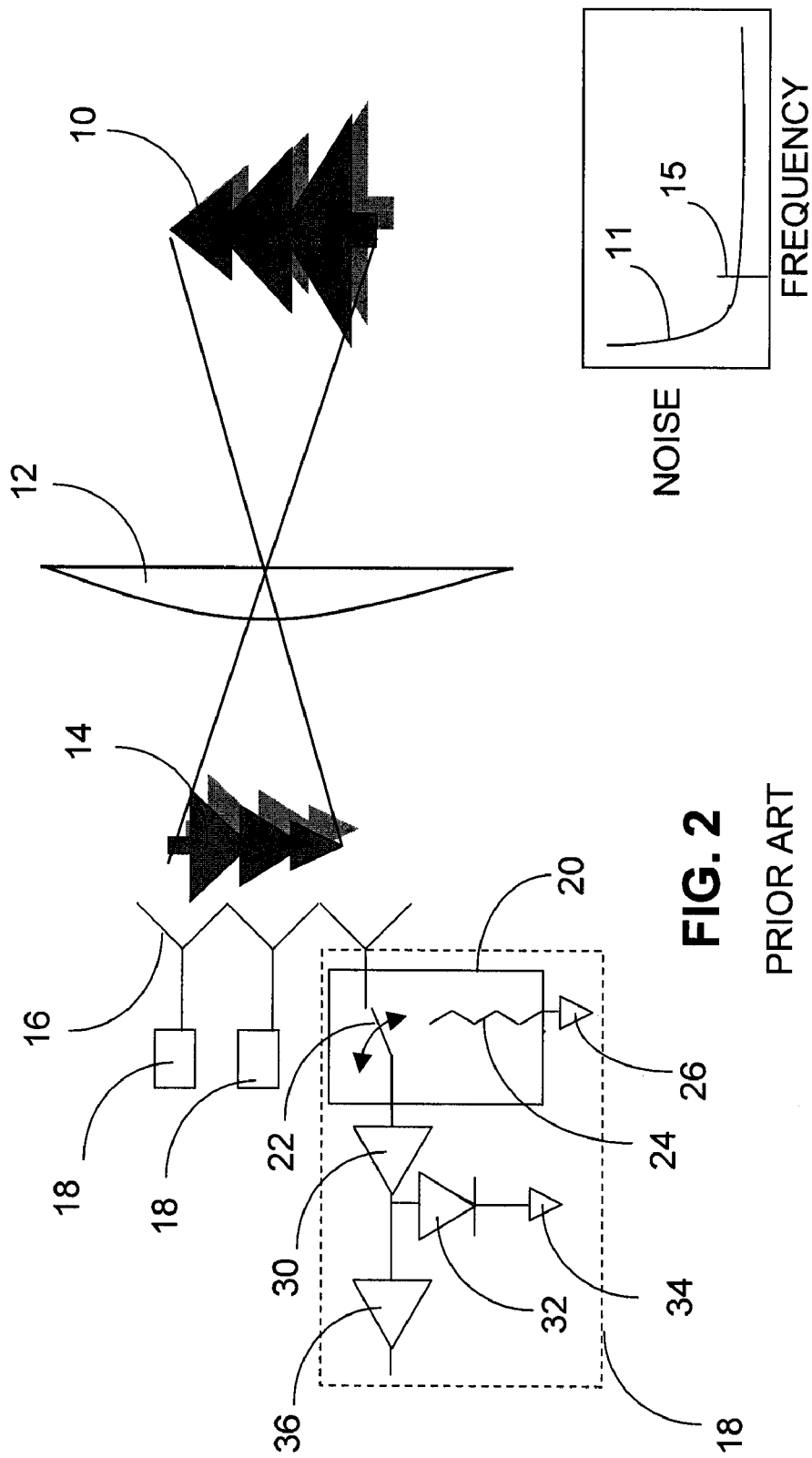

METHOD FOR COMPENSATING A MILLIMETER WAVE IMAGING ARRAY

TECHNICAL FIELD

This disclosure relates to methods for compensating imaging arrays and in particular for millimeter wave imaging arrays.

BACKGROUND

Imaging arrays have sensitivities that are limited by 1/f noise caused by gain fluctuations that produce an output drift over time. FIG. 1 shows a graph for a typical 1/f noise spectrum. The 1/f noise has a frequency spectrum (noise vs. frequency (f)) that generally follows a 1/f curve 11 and hence the name for 1/f noise. Above a knee frequency 15 the noise is generally white noise. The cause of 1/f noise is related to properties inherent in all semiconductors, which are used in many applications including imaging arrays. The noise at frequencies below the knee frequency 15 causes the imaging array's output to drift in time. Therefore, it cannot be determined whether the output of a sensor in an imaging array is changing because the scene is changing or whether the output change is due to 1/f noise, unless some step is taken to compensate or calibrate out the drift.

There are currently many methods of calibrating the drift, and these methods can be broken down into two categories: one that applies only to mechanically scanned arrays and one that applies to scanning or staring (non-scanning) arrays.

In mechanically scanned arrays the sensors are moved to scan an image. For example, a mechanically scanned array can be a line array of sensors. Mechanically scanning the imaging elements modulates the signals by creating a time varying element output as the element scans across a scene.

This modulation shifts the image signal to a higher frequency and effectively separates the signal from the 1/f noise in frequencies below the knee frequency. One can subtract the average value of the signal across the entire scan from the scan signal and limit the drift to what occurs within that scan as disclosed by M. A. Janssen, D. Scott, M. White, M. D. Seiffert, C. R. Lawrence, K. M. Gorski, M. Dragovan, T. Gaier, K. Ganga, S. Gulkis, A. E. Lange, S. M. Levin, P. M. Lubin, P. Meinhold, A. C. S. Readhead, P. L. Richards, J. E. Ruhl, "Direct images of the CMB from space," Astrophysical journal, 1996, pp. 15. This method has the advantage of not requiring any additional hardware; however, appreciable drift can still occur within the scan period. To ensure minimal impact of drift on the sensor performance, the image must be scanned at a rate at least four times the knee frequency, which modulates the image signal to be within the white noise spectrum of the 1/f noise. Because typical commercial sensors have knee frequencies of 1 KHz or more, this method cannot be effectively applied due to the high scan rates required.

The methods used to calibrate staring arrays do not depend on movement of the sensor elements; however, these methods can also be applied to scanned arrays if desired. One method uses a switch, called a Dicke switch, to modulate the image signal, as disclosed in Ulaby, Microwave Remote Sensing, Vol 1, Artech House, Mass., 1981, section 6-9. Another method of modulating the image signal is to use a rotating optical blade, which is called an optical chopper, in front of the sensors. The Dicke switch and the optical chopper both modulate the input signal to move the image signal spectral energy away from the low frequency noise, thereby minimizing drift effects.

The Dicke switch must be installed in each element separately, and therefore adds significant cost to the array. Furthermore, the Dicke switch introduces losses that degrade the sensitivity of the array.

An optical chopper has the advantage of modulating all of the elements at once because it can be placed in front of all the sensors. The drawback of optical choppers is that they cannot spin at high enough rates to modulate the image signal above typical knee frequencies. In addition, optical choppers often create audible noise and also require significant space when used with large arrays. Because an optical chopper is a moving part, more maintenance is required.

Another method of drift compensation is called noise injection. In this scheme each sensor contains a noise source that is coupled into each sensor input. The noise source is switched on and off at a rate higher than the knee frequency. By taking the ratio of the output of the sensor during the on and off times, one can eliminate the output drift due to temporal gain fluctuations. This method is disclosed in Ulaby, Microwave Remote Sensing, Vol 1, Artech House, Mass., 1981, section 6-12. John D. Kraus, in Radio-Telescope Receivers, McGraw Hill, N.Y., 1966, pages 289-290 discusses the same method for a radio telescope receiver. This method requires additional hardware to be designed into each of the sensors, adding significant cost. Furthermore, the ability to calibrate out drift is limited to the inherent stability of the noise source. Noise sources contain uncontrolled amplitude fluctuations, typically with a 1/f type of noise spectrum, and these fluctuations add additional drift to the output that cannot be compensated using the noise injection method disclosed by Ulaby and Kraus.

What is needed is a method for compensating out 1/f noise for an arbitrarily sized array of sensors, whether the sensors are mechanically scanned or staring. Also needed is a method that is not limited by the stability of the output of a reference or noise source. Also each individual sensor in the imaging array should be able to be compensated while adding only a small cost to the imaging array. The embodiments of the present disclosure answer these and other needs.

SUMMARY

In a first embodiment disclosed herein, a method for compensating a plurality of sensors comprises exposing each of the plurality of sensors to a scene energy from a scene and obtaining a plurality of first outputs with each first output corresponding to a signal output from one of the plurality of sensors during a first time interval, exposing each of the plurality of sensors to the scene energy from the scene and a reference signal energy and obtaining a plurality of second outputs with each second output corresponding to the signal output from one of the plurality of sensors during a second time interval, exposing each of the plurality of sensors to a uniform signal energy and obtaining a plurality of third outputs with each third output corresponding to the signal output from one of the plurality of sensors during a third time interval, exposing each of the plurality of sensors to the uniform signal energy and the reference signal energy and obtaining a plurality of fourth outputs with each fourth output corresponding to the signal output from one of the plurality of sensors during a fourth time interval, obtaining a first reference output of a reference sensor during the first time interval, exposing the reference sensor to the reference signal energy and obtaining a second reference output of the reference sensor during the second time interval, obtaining a third reference output of the reference sensor during the third time interval, exposing the reference sensor to the reference signal energy and obtaining a fourth reference output of the reference sensor during the fourth time interval, and determining the scene energy received by each of the plurality of sensors relative to the reference signal energy from the first output, second output, third output, fourth output, first reference output, second reference output, third reference output, and fourth reference output.

In another embodiment disclosed herein, a method for compensating a plurality of sensors comprises exposing each of the plurality of sensors to a scene energy from a scene and obtaining a plurality of first outputs with each first output corresponding to a signal output from one of the plurality of sensors during a first time interval, exposing each of the plurality of sensors to the scene energy from the scene and a reference signal energy and obtaining a plurality of second outputs with each second output corresponding to the signal output from one of the plurality of sensors during a second time interval, exposing each of the plurality of sensors to a uniform signal energy different from the reference signal energy and obtaining a plurality of third outputs with each third output corresponding to the signal output from one of the plurality of sensors during a third time interval, exposing each of the plurality of sensors to the uniform signal energy and the reference signal energy and obtaining a plurality of fourth outputs with each fourth output corresponding to the signal output from one of the plurality of sensors during a fourth time interval, obtaining a first reference output of a reference sensor during the first time interval, exposing the reference sensor to the reference signal energy and obtaining a second reference output of the reference sensor during the second time interval, obtaining a third reference output of the reference sensor during the third time interval, exposing the reference sensor to the reference signal energy and obtaining a fourth reference output of the reference sensor during the fourth time interval, and determining the scene energy received by each of the plurality of sensors relative to the uniform signal energy from the first output, second output, third output, fourth output, first reference output, second reference output, third reference output, and fourth reference output.

In another embodiment disclosed herein, an imaging array comprises a plurality of sensors for sensing scene energy from a scene, only one reference sensor, only one reference signal source for transmitting a reference signal to the plurality of sensors and the reference sensor, a switch for turning the transmission from the reference signal source on and off, a uniform energy source for providing uniform signal energy to the plurality of sensors, and a processor for compensating the plurality of sensors by processing a first output from each of the plurality of sensors when the plurality of sensors are receiving energy from the scene, a second output from each of the plurality of sensors when the plurality of sensors are receiving energy from the scene and the reference signal, a third output from each of the plurality of sensors when the plurality of sensors are receiving the uniform signal energy, a fourth output from each of the plurality of sensors when the plurality of sensors are receiving the uniform signal energy and the reference signal, a first reference output when the plurality of sensors are receiving only the energy from the scene, a second reference output when the reference sensor is receiving the reference signal and the plurality of sensors are receiving the energy from the scene and the reference signal, a third reference output when the sensors are receiving only the uniform signal energy, and a fourth reference output when the reference sensor is receiving the reference signal and the sensors are receiving the uniform signal energy and the reference signal.

These and other features and advantages will become further apparent from the detailed description and accompanying figures that follow. In the figures and description, numerals indicate the various features, like numerals referring to like features throughout both the drawings and the description.

BRIEF DESCRIPTION OF THE DRAWINGS

FIG. 1 is a graph representative of 1/f noise in accordance with the prior art;

FIG. 2 shows a typical imaging array with a Dicke switch in accordance with the prior art;

DETAILED DESCRIPTION

Figure 3:
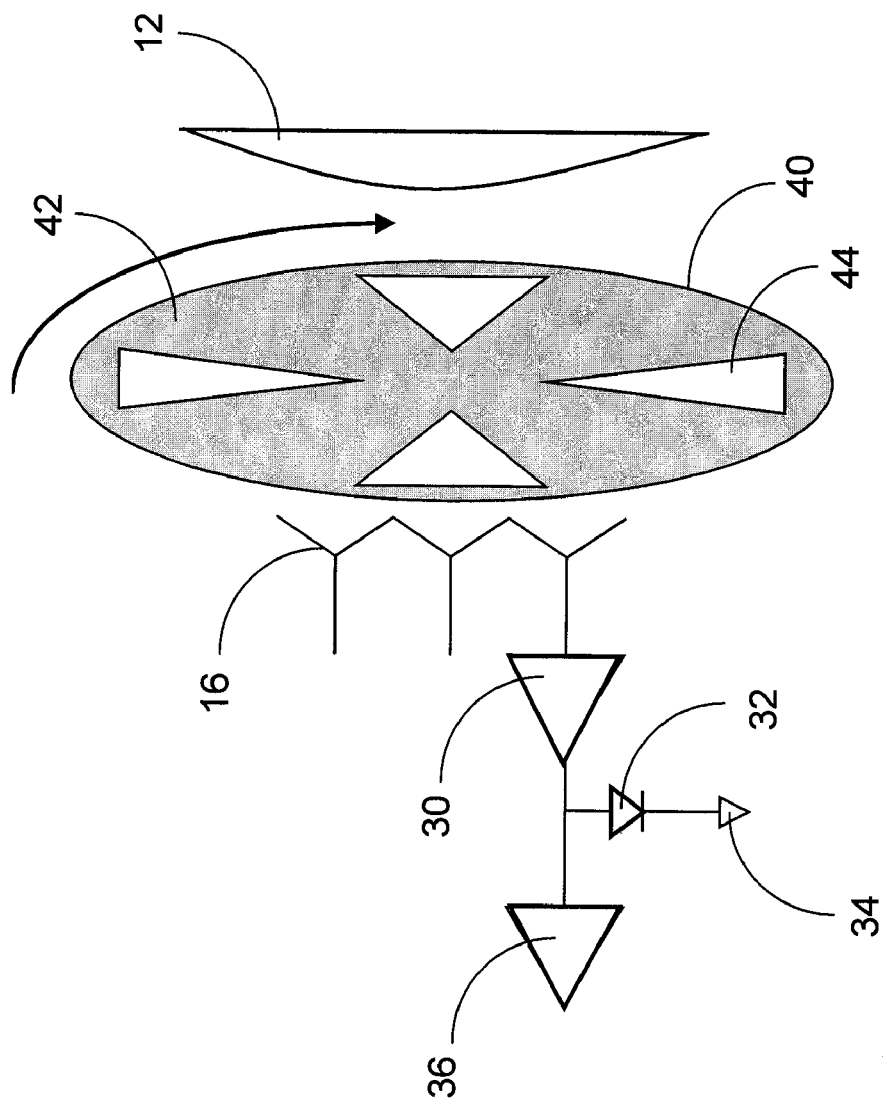
FIG. 3 is a typical imaging array using an optical chopper in accordance with the prior art.

In the following description, numerous specific details are set forth to clearly describe various specific embodiments disclosed herein. One skilled in the art, however, will understand that the presently claimed invention may be practiced without all of the specific details discussed below. In other instances, well known features have not been described so as not to obscure the invention.

Referring to FIG. 2, a typical imaging array with a Dicke switch to compensate for the 1/f noise is shown in accordance with the prior art. The image 10 is generally focused by a lens 12 to focus the image 14 onto a sensor array. For a millimeter wave imaging array, each sensor in the array has an antenna 16 and a millimeter wave receiver 18. A receiver typically has a Dicke switch 20, a low noise amplifier 30, a detector 32 and a video amplifier 36. The detector 32 is tied, to a ground 34. The purpose of the detector is to detect the envelope or video frequencies of the image signal and filter out the high RF frequencies. As discussed above, the Dicke switch 20 modulates the image signal 14 by switching switch 22. This switches the input to the low noise amplifier 30 between the antenna 16 and the reference, which in this case is a resistor 24 to ground 26. If the switching is fast enough, then the image signal is modulated above the knee frequency of the 1/f noise. A key drawback of this method is that the Dicke switch 20 must be installed in each receiver 18, and therefore adds significant cost to the sensor array. Furthermore, the Dicke switch 20 introduces losses that degrade the sensitivity of the array.

In the above, the receiver is described as having an LNA and a detector; however, it will be understood by one skilled in the art there are millimeter wave receivers that contain mixers, phase switches, baluns, and so on.

FIG. 3 shows a typical millimeter wave imaging array using an optical chopper in accordance with the prior art. The image focused by lens 12 passes through a rotating optical chopper 40 that has opaque areas 42 and open areas 44. The rotation of the opaque and open areas causes modulation of the image signal, which shifts the image signal above the knee frequency of the 1/f noise. The image signal then is received by the antennas 16 and the receivers, each of which include a low noise amplifier 30, detector 32 and video amplifier 36. The optical chopper 40 has the advantage of modulating all of the elements at once because it can be placed in front of all the input antennas 16. The disadvantage is that an optical chopper cannot spin at high enough rates to compensate for typical knee frequencies. In addition, optical choppers often create audible noise and require significant packaging volume. Another disadvantage is that the optical chopper is a moving part that can wear out over time and require maintenance.

Figure 4:
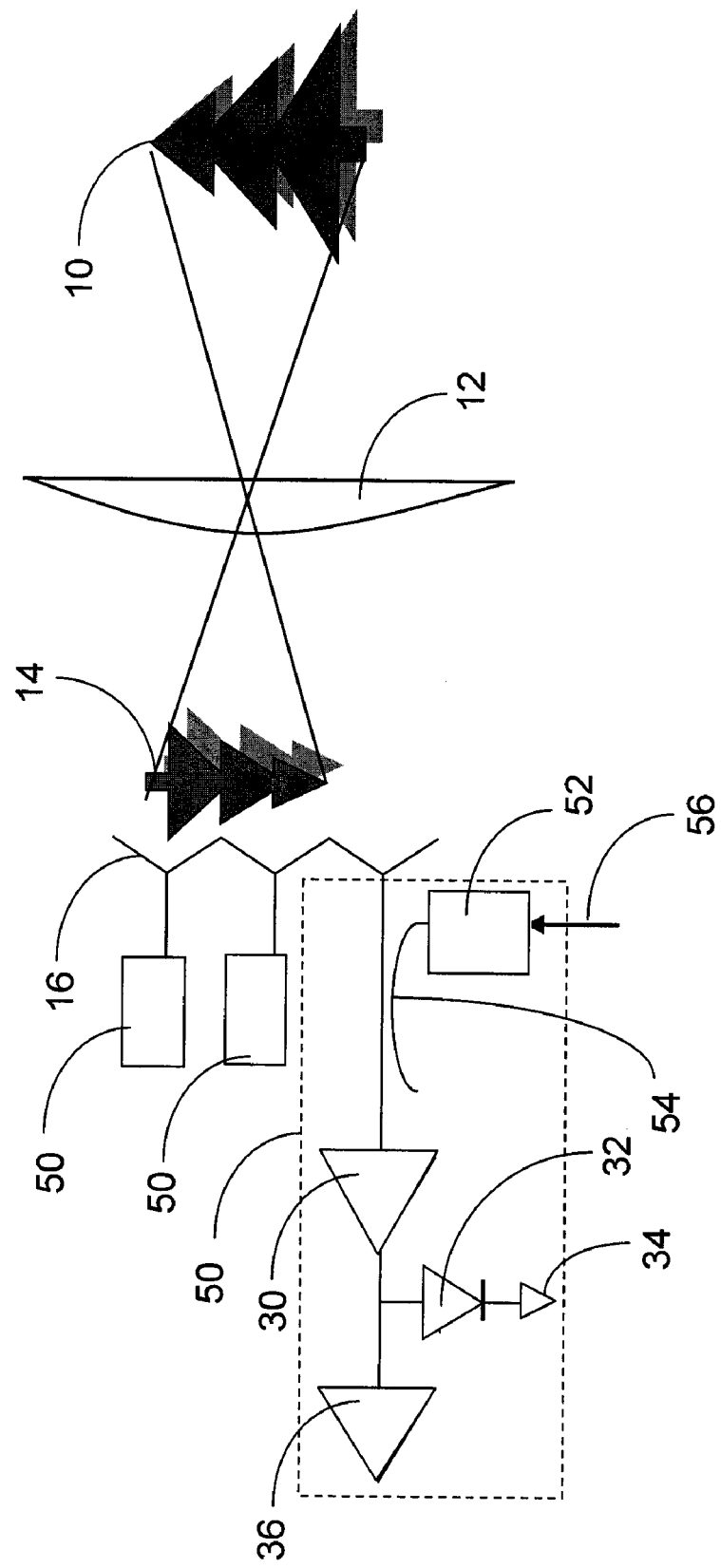
FIG. 4 is typical imaging array using a noise injection method in accordance with the prior art.

FIG. 4 shows a typical imaging array using a noise injection method in accordance with the prior art. In this method each receiver 50 has a noise source 52 that is coupled into the input to low noise amplifier 30 via a directional coupler 54. The noise source 52 is switched on and off at a rate higher than the knee frequency to modulate the image signal to shift the image signal above the knee frequency.

The noise injection method of FIG. 4 requires the noise source 52 to be added into each of the receivers 50, adding significant cost. The ability to calibrate out drift is limited to the inherent stability of the noise source 52. It is very difficult to achieve a stable noise source, because noise sources contain uncontrolled amplitude fluctuations and also have a 1/f noise spectrum. These fluctuations and 1/f noise in the noise source 52 add additional drift to the output of the video amplifier 36 for each receiver 50. Because each noise source in each receiver 50 has slightly different fluctuations and 1/f noise spectrum, compensating for all the drift is very difficult.

Figure 5:
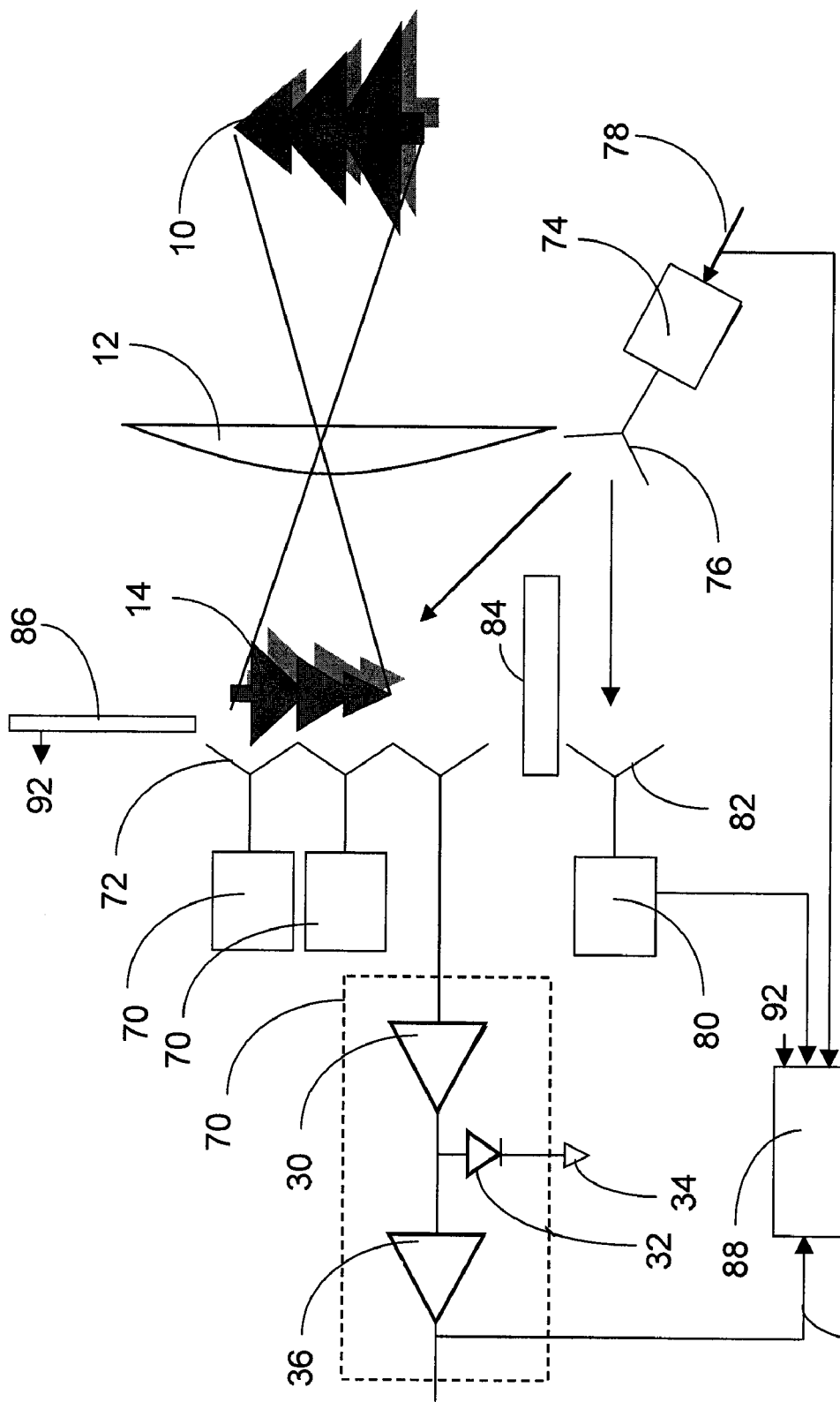
FIG. 5 is an imaging array in accordance with the present disclosure.

Referring now to FIG. 5, a millimeter wave imaging array is shown that allows the gain fluctuations to be compensated in an imaging array for a small added cost in accordance with the present disclosure. A millimeter wave imaging array generally operates in the W band or between about 75 GHz to 110 GHz. A millimeter wave imaging array senses the thermal energy from an image. Calibration or compensation is necessary to distinguish real temperature changes in the image from drift caused by the 1/f noise. The methods are described herein for millimeter wave frequencies; however, the methods can be effectively used for other frequency bands.

The image 10 is focused by lens 12 to focus the image signal 14 onto the sensor array, which for a millimeter wave imaging array, has an array of antennas 72 each of which is connected to a receiver 70. Each receiver may have a low noise amplifier 30, a detector 32, which can be a diode, and optionally a video amplifier 36.

Figure 6:
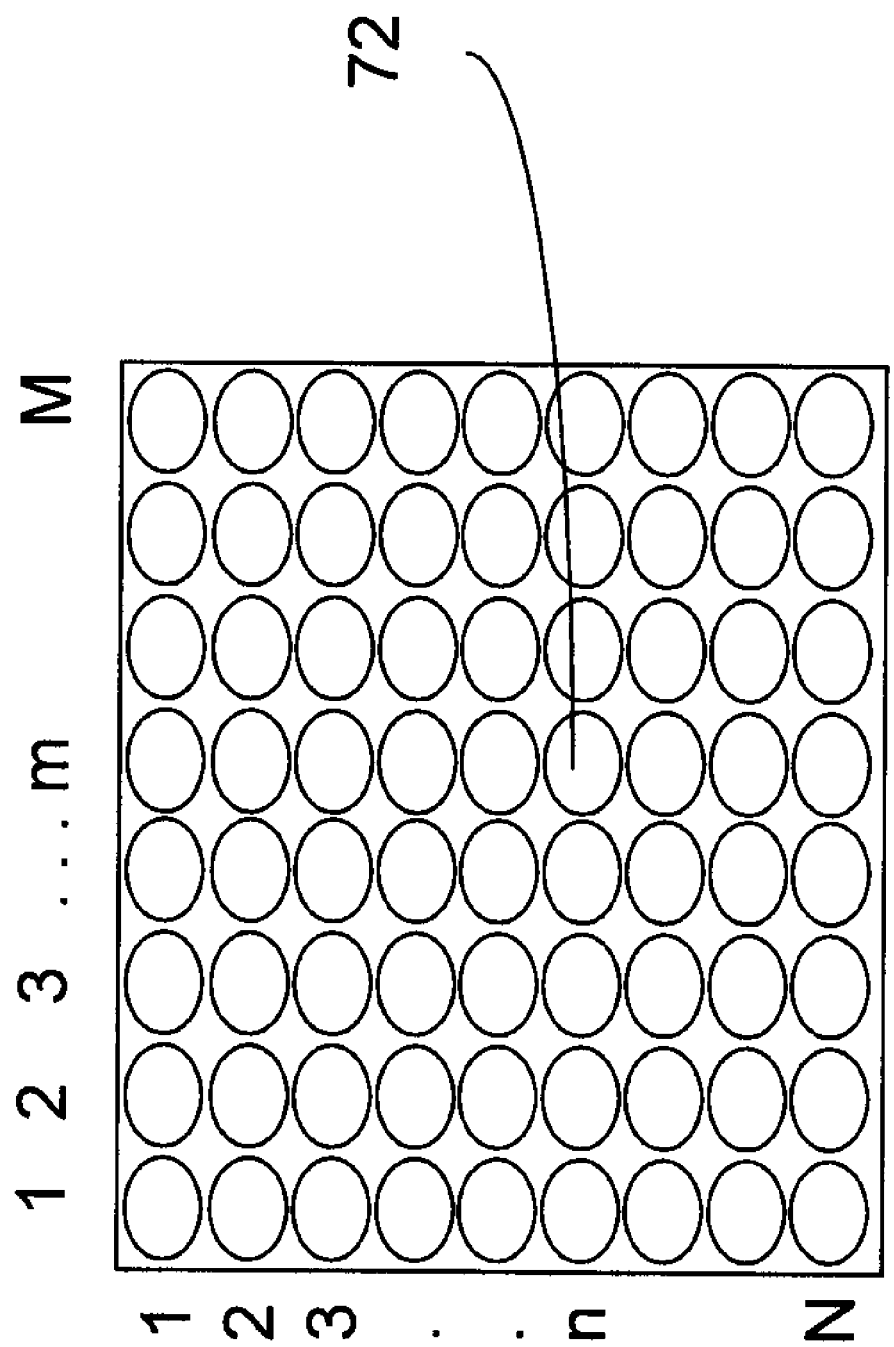
FIG. 6 is a front view of an array of antennas in accordance with the present disclosure.

FIG. 6 is a front view of an M by N array of antennas 72. In this disclosure reference is made to the $(m,n)^{th}$ sensor, which is a reference to one of the sensors in the array. In FIG. 6 the $(m,n)^{th}$ sensor is shown as one of the antennas 72 in the array. For example, in an array that is 1024×1280 the $(3,5)^{th}$ sensor refers to the sensor in the third column and fifth row.

Figure 7:
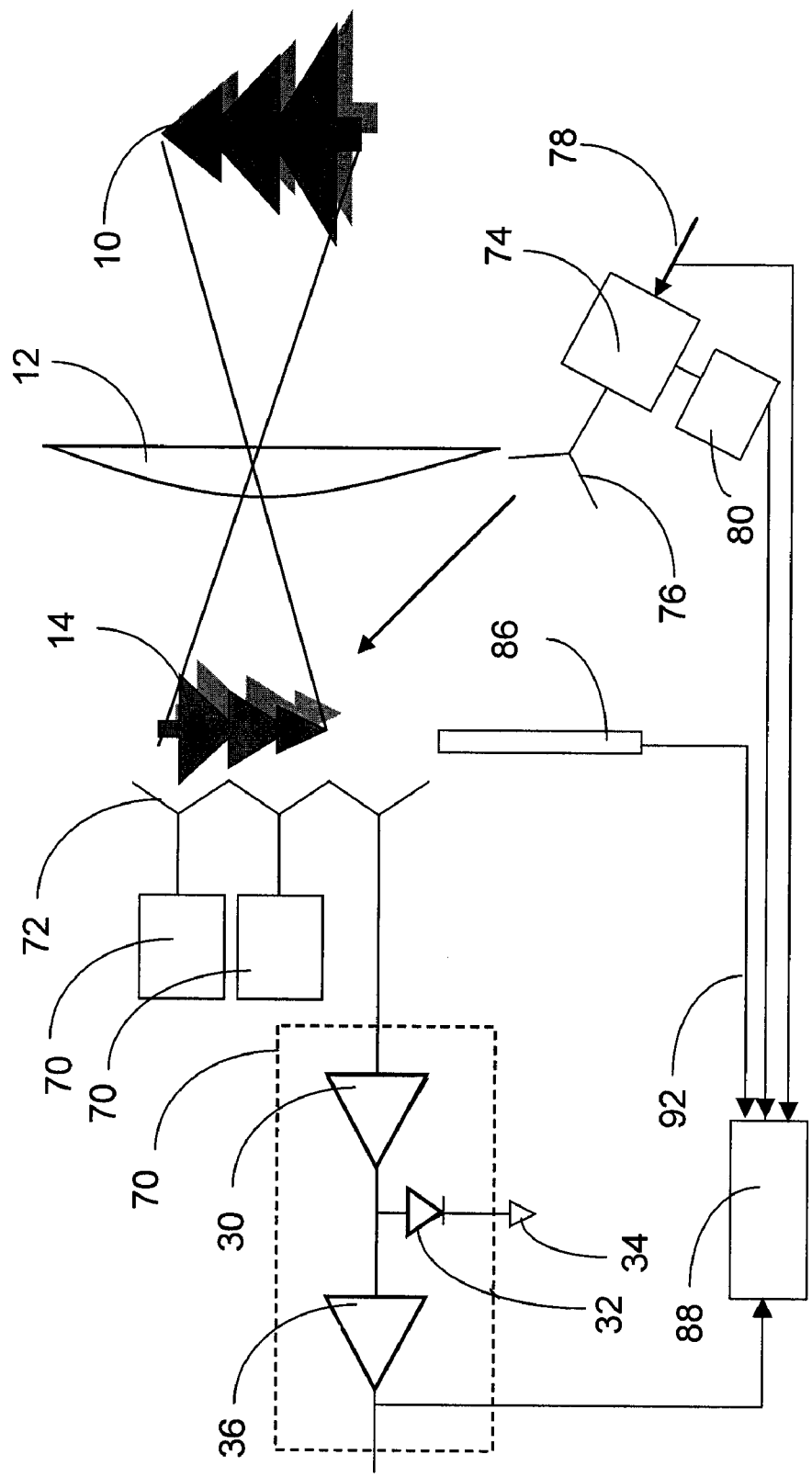
FIG. 7 is another imaging array in accordance with the present disclosure.

Returning to FIG. 5, a single reference source 74 transmits a reference signal or noise via antenna 76 to all of the receivers 70. The reference signal or noise is not a single frequency but has a bandwidth of approximately 20 GHz centered within the W band. A control 78 turns on and off the transmission from the reference source 74. In general, the periods during which the transmission from the reference source 74 is on and the periods during which the transmission from the reference source 74 is off, alternate at a frequency above the knee frequency, in order to shift the image signal to frequencies above the knee frequency. The reference source 74 also transmits in an on/off alternating manner to a reference receiver 80, which is separate from the receiver 70 and is blocked from the image signal by optical blocker 84. In FIG. 5 the reference receiver 80 receives the transmission from the reference source 74 via antenna 82. However, as shown in FIG. 7, the reference receiver 80 in accordance with the present disclosure can be coupled directly to the reference source 74. In this embodiment there is no need for optical blocker 84 or antenna 82. The method works equally as well in either the embodiment of FIG. 5 or the embodiment of FIG. 7.

A uniform energy source 86 may be used at least once in the method further explained below to provide a uniform energy to all of the sensors so that all the antennas 72 and receivers 70 receive the uniform energy. One implementation of the uniform energy source 86 is a black body absorber, which would ensure that all the sensors are receiving uniform energy and in the case of a black body absorber the received energy would be very low. The method can use any other means of providing a uniform energy to all of the sensors in the imaging array.

A processor 88 can be used to calculate the scene energy received by each of the sensors, each having an antenna 72 and a receiver 70, relative to the reference signal energy transmitted by the reference source 74. Thermal energy can be expressed as kT, where k is Boltzmann's constant and T is temperature. For a two dimensional array of sensors with indices m,n, as shown in FIG. 6, what is desired is to determine the thermal energy of the $(m,n)^{th}$ sensor, which is $kT_{m,n}$ relative to a reference such as the reference source thermal energy which can be represented as $kT_{0,0}$. The inputs to processor 88 are from the output of each receiver 70 and from the output of reference receiver 80. Another input to processor 88 is control 78, which provides the timing of when the reference source is transmitting and when it is not. The processor also needs to know when the uniform energy source is applied to all the sensors.

Figure 8:
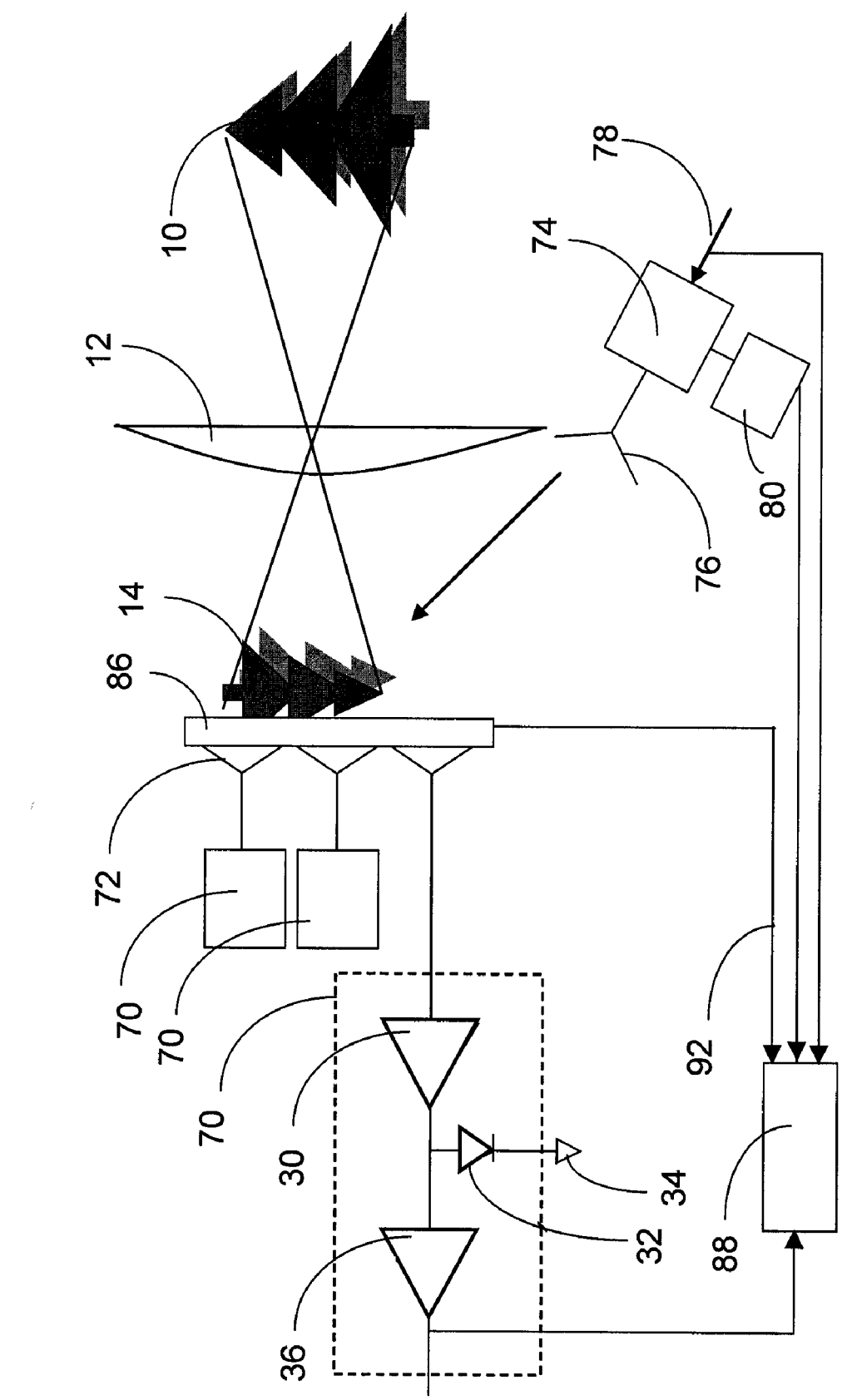
FIG. 8 is the imaging array of FIG. 7 with a uniform energy source in front of the sensors in accordance with the present disclosure.

FIG. 8 shows one way of applying a uniform energy to all the sensors in accordance with the present disclosure. A uniform energy source 86 is placed directly in front of the array of antennas 72. Input 92 from the uniform energy source 86 provides the timing to the processor 88 for when the uniform energy source is applied.

Referring again to FIG. 5, if we consider a two dimensional array of sensors with indices m,n, the output voltage 93 of the $(m,n)^{th}$ sensor can be written as a function of the various sensor parameters. When the transmission from the reference source 74 is turned on, the reference source 74 transmits a reference signal, which can be noise, into all of the array sensors simultaneously and, as discussed above, the reference receiver, as well. When the reference source 74 transmission is ON the output voltage of the $(m,n)^{th}$ sensor can be expressed as quantity (1):

$$V_{m,n}^{cal}=(kT_{m,n}^s \Delta f_{m,n}+\alpha_{m,n}P((t))\beta_{m,n}(t) \quad (1)$$

and when the reference source 74 transmission is OFF the output voltage of the $(m,n)^{th}$ sensor can be expressed as quantity (2):

$$V_{m,n}^{sig}=kT_{m,n}^s \Delta f_{m,n}\beta_{m,n}(t). \quad (2)$$

$T_{m,n}^s$ is the equivalent scene temperature at the (m,n)th element and $\Delta f_{m,n}$ is the RF bandwidth of the (m,n)th element. While all the sensors in this embodiment are millimeter wave sensors, it is recognized that each sensor will have a slightly different RF bandwidth. The reference signal transmitted by the reference source 74 has an instantaneous power P(t), which indicates the reference signal is a function of time. An attenuation factor $\alpha_{m,n}$ is applied to account for the differences in receipt of the reference signal by each sensor due to variations in the transmit antenna pattern from antenna 76 as viewed by the receive antenna pattern for the antenna 72 for each sensor. The formula assumes that the 1/f noise is due entirely to temporal fluctuations of the sensor gain $\beta_{m,n}(t)$, which has units of volts/watt. Again it is recognized that each sensor will have a slightly different sensor gain, and the sensor gain is a function of time. Taking the ratio of quantities (1) and (2) and rearranging, we can determine the scene temperature relative to the instantaneous power received by each of the elements, which is quantity (3):

$$\frac{kT_{m,n}^s \Delta f_{m,n}}{\alpha_{m,n} P(t)} = \frac{1}{\left.\frac{V_{m,n}^{cal}}{V_{m,n}^{sig}}\right. - 1}. \tag{3}$$

The instantaneous power $P(t)$ can be removed using the reference receiver 80 output. Note that the reference receiver is blocked to prevent energy from the scene from entering the reference receiver 80, or as discussed above is coupled directly to the reference source 74. Thus the reference receiver 80 has a stable output that has a constant equivalent temperature $T_o$. Using the subscript 0,0 for the reference element, one can form the same ratio as above to determine the reference temperature relative to the instantaneous power from the reference source 74, to obtain quantity (4):

$$\frac{kT_0 \Delta f_{0,0}}{\alpha_{0,0} P(t)} = \frac{1}{\left.\frac{V_{0,0}^{cal}}{V_{0,0}^{sig}}\right. - 1}. \tag{4}$$

Dividing the two quantities (3) and (4) gives the scene temperature as sensed by each of the sensors in the array relative to the reference temperature, which is quantity (5):

$$\frac{T_{m,n}^s \Delta f_{m,n}}{T_0 \Delta f_{0,0}} \frac{\alpha_{0,0}}{\alpha_{m,n}} = \frac{\frac{V_{0,0}^{cal}}{V_{0,0}^{sig}} - 1}{\frac{V_{m,n}^{cal}}{V_{m,n}^{sig}} - 1}. \tag{5}$$

This quantity (5) still contains variations in the bandwidth and different attenuation factors for each of the sensors. However, these are fixed quantities for each sensor that typically do not vary in time. These quantities can be calibrated out by performing a uniform energy calibration of the sensors. One embodiment of providing uniform energy calibration is to put a uniform energy source in front of the lens 12. It is desirable that the reference source 74 have a higher energy than the uniform energy source.

Another embodiment of performing a uniform energy calibration is to perform a "blanking" of the sensors by placing a blackbody absorber directly in front of the sensor array, as shown in FIG. 8 as uniform energy source 86, to produce a uniform scene temperature for all of the elements.

The same method of deriving quantity (3) is used, but with the sensors 70 receiving the uniform signal energy from the uniform energy source 86 and the alternating on/off transmission from reference source 74 rather than the scene temperature and the alternating on/off transmission from reference source 74. The alternating on/off transmission from reference source 74 is again at a frequency above the knee frequency. The uniform scene temperature relative to the instantaneous power from the reference source 74 can be determined to be the quantity (6):

$$\frac{kT_0 \Delta f_{m,n}}{\alpha_{m,n} P(t)} = \frac{1}{\left.\frac{V_{m,n}^{cal}}{V_{m,n}^{sig}}\right|_{blank} - 1}. \tag{6}$$

Again, the instantaneous power $P(t)$ can be removed by obtaining the reference receiver 80 output when the transmission from reference source 74 is on and off during the period when the uniform signal energy or blanking is applied to the sensors to obtain a modified quantity (4) (not shown). Dividing quantity (6) by modified quantity (4) gives quantity (7).

$$\frac{\Delta f_{m,n}}{\Delta f_{0,0}} \frac{\alpha_{0,0}}{\alpha_{m,n}} = \frac{\left.\frac{V_{0,0}^{cal}}{V_{0,0}^{sig}}\right|_{blank} - 1}{\left.\frac{V_{m,n}^{cal}}{V_{m,n}^{sig}}\right|_{blank} - 1}. \tag{7}$$

Finally, dividing quantity (5) by quantity (7) gives the quantity (8), which is the scene temperature as sensed by the (m,n)th sensor relative to the reference source temperature, independent of the other parameters:

$$\frac{T_{m,n}^s}{T_0} = \frac{\frac{V_{0,0}^{cal}}{V_{0,0}^{sig}} - 1}{\frac{V_{m,n}^{cal}}{V_{m,n}^{sig}} - 1} \cdot \frac{\left.\frac{V_{m,n}^{cal}}{V_{m,n}^{sig}}\right|_{blank} - 1}{\left.\frac{V_{0,0}^{cal}}{V_{0,0}^{sig}}\right|_{blank} - 1}. \tag{8}$$

Thus, each sensor can be compensated against the reference source regardless of variations in the bandwidth and sensor gain of each of the sensors (70, 72), and independent of time variations in the reference source transmission. When equation 8 is applied to each sensor element, the result is an image where the detrimental effects of bias and drift have been eliminated by using a normalized output.

In the embodiment of the method as described above, it is assumed the uniform energy source temperature is equal to the reference source temperature. This would generally be the case, because of the proximity in packaging. However, the method still works if they are different, the result being instead relative to the uniform energy source temperature. For example, if the reference source temperature is $T_o$ and the uniform energy source temperature is $T_1$, and $T_o$ does not equal $T_1$, then the quantity (8) is changed to have $T_1$ in the denominator rather than $T_o$.

Note that quantity (8) can easily be converted to an energy ratio by multiplying the numerator temperature, which is in degrees Kelvin, and the denominator temperature, which is also in degrees Kelvin, by k Boltzmann's constant, which converts the temperature units to energy (joules).

The embodiments have been described for millimeter wave imaging sensors; however, the method is equally applicable to compensating sensor arrays at different wavelengths. For example, the method can be used for infrared and visible imaging arrays. The method can also be used for radar frequency bands including, as a nonlimiting example, X band and Ku bands, for compensating active array radars.

Having now described the invention in accordance with the requirements of the patent statutes, those skilled in this art will understand how to make changes and modifications to the present invention to meet their specific requirements or conditions. Such changes and modifications may be made without departing from the scope and spirit of the invention as disclosed herein.

The foregoing Detailed Description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. Applicant has made this disclosure with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the Claims. No claim element herein is to be construed under the provisions of 35 U.S.C. Sec. 112, sixth paragraph, unless the element is expressly recited using the phrase "means for . . . " and no method or process step herein is to be construed under those provisions unless the step, or steps, are expressly recited using the phrase "comprising the step(s) of . . . "

What is claimed is:

1. A method for compensating a plurality of sensors, the method comprising:
    exposing each of the plurality of sensors to a scene energy from a scene and obtaining a plurality of first outputs with each first output corresponding to a signal output from one of the plurality of sensors during a first time interval;
    exposing each of the plurality of sensors to the scene energy from the scene and a reference signal energy and obtaining a plurality of second outputs with each second output corresponding to the signal output from one of the plurality of sensors during a second time interval;
    exposing each of the plurality of sensors to a uniform signal energy and obtaining a plurality of third outputs with each third output corresponding to the signal output from one of the plurality of sensors during a third time interval;
    exposing each of the plurality of sensors to the uniform signal energy and the reference signal energy and obtaining a plurality of fourth outputs with each fourth output corresponding to the signal output from one of the plurality of sensors during a fourth time interval;
    obtaining a first reference output of a reference sensor during the first time interval;
    exposing the reference sensor to the reference signal energy and obtaining a second reference output of the reference sensor during the second time interval;
    obtaining a third reference output of the reference sensor during the third time interval;
    exposing the reference sensor to the reference signal energy and obtaining a fourth reference output of the reference sensor during the fourth time interval; and
    determining the scene energy received by each of the plurality of sensors relative to the reference signal energy from the first output, second output, third output, fourth output, first reference output, second reference output, third reference output, and fourth reference output.

2. The method of claim 1 wherein the step of determining the scene energy received by each of the plurality of sensors relative to the reference signal energy comprises the steps of:
    dividing the second reference output by the first reference output and subtracting unity to form a first quantity;
    dividing each second output by the first output for the corresponding sensor of the plurality of sensors and subtracting unity to form a second quantity;
    dividing the fourth reference output by the third reference output and subtracting unity to form a third quantity;
    dividing each fourth output by the third output for the corresponding sensor of the plurality of sensors and subtracting unity to form a fourth quantity; and
    dividing a first product of multiplying the first quantity times the fourth quantity by a second product of multiplying the second quantity times the third quantity.

3. The method of claim 1 further comprising blocking the reference sensor from receiving the scene energy and from receiving the uniform signal energy.

4. The method of claim 1 wherein each of the plurality of sensors and the reference sensor comprise a millimeter wave receiver.

5. The method of claim 1 wherein the plurality of sensors comprise a mechanically scanned array.

6. The method of claim 1 wherein the plurality of sensors comprise a staring array.

7. The method of claim 1 wherein:
    the reference signal energy alternates between being off during the first time interval and being on during the second time interval at a frequency above a knee frequency; and
    the reference signal energy alternates between being off during the third time interval and being on during the fourth time interval at a frequency above the knee frequency.

8. The method of claim 1 wherein the reference signal energy is higher than the uniform signal energy.

9. The method of claim 8 wherein the reference signal energy is relative to a reference temperature and the uniform signal energy is relative to a uniform temperature.

10. The method of claim 1 wherein the plurality of sensors and the reference sensor are active array radar antenna sensors.

11. A method for compensating a plurality of sensors, the method comprising:
    exposing each of the plurality of sensors to a scene energy from a scene and obtaining a plurality of first outputs with each first output corresponding to a signal output from one of the plurality of sensors during a first time interval;
    exposing each of the plurality of sensors to the scene energy from the scene and a reference signal energy and obtaining a plurality of second outputs with each second output corresponding to the signal output from one of the plurality of sensors during a second time interval;
    exposing each of the plurality of sensors to a uniform signal energy different from the reference signal energy and obtaining a plurality of third outputs with each third output corresponding to the signal output from one of the plurality of sensors during a third time interval;

exposing each of the plurality of sensors to the uniform signal energy and the reference signal energy and obtaining a plurality of fourth outputs with each fourth output corresponding to the signal output from one of the plurality of sensors during a fourth time interval;

obtaining a first reference output of a reference sensor during the first time interval;

exposing the reference sensor to the reference signal energy and obtaining a second reference output of the reference sensor during the second time interval;

obtaining a third reference output of the reference sensor during the third time interval;

exposing the reference sensor to the reference signal energy and obtaining a fourth reference output of the reference sensor during the fourth time interval; and determining the scene energy received by each of the plurality of sensors relative to the uniform signal energy from the first output, second output, third output, fourth output, first reference output, second reference output, third reference output, and fourth reference output.

12. The method of claim 11 wherein the step of determining the scene energy received by each of the plurality of sensors relative to the uniform signal energy comprises the steps of:

dividing the second reference output by the first reference output and subtracting unity to form a first quantity;

dividing each second output by the first output for the corresponding sensor of the plurality of sensors and subtracting unity to form a second quantity;

dividing the fourth reference output by the third reference output and subtracting unity to form a third quantity;

dividing each fourth output by the third output for the corresponding sensor of the plurality of sensors and subtracting unity to form a fourth quantity; and dividing a first product of multiplying the first quantity times the fourth quantity by a second product of multiplying the second quantity times the third quantity.

13. The method of claim 11 wherein each of the plurality of sensors and the reference sensor comprise a millimeter wave receiver.

14. The method of claim 11 wherein:

the reference signal energy alternates between being off during the first time interval and being on during the second time interval at a frequency above a knee frequency; and the reference signal energy alternates between being off during the third time interval and being on during the fourth time interval at a frequency above the knee frequency.

15. The method of claim 11 wherein the reference signal energy is relative to a reference temperature and the uniform signal energy is relative to a uniform temperature.

16. An imaging array comprising:

a plurality of sensors for sensing scene energy from a scene;

only one reference sensor;

only one reference signal source for transmitting a reference signal to the plurality of sensors and the reference sensor;

a switch for turning the transmission from the reference signal source on and off;

a uniform energy source for providing uniform signal energy to the plurality of sensors; and a processor for compensating the plurality of sensors by processing:

a first output from each of the plurality of sensors when the plurality of sensors are receiving energy from the scene;

a second output from each of the plurality of sensors when the plurality of sensors are receiving energy from the scene and the reference signal;

a third output from each of the plurality of sensors when the plurality of sensors are receiving the uniform signal energy;

a fourth output from each of the plurality of sensors when the plurality of sensors are receiving the uniform signal energy and the reference signal;

a first reference output when the plurality of sensors are receiving only the energy from the scene;

a second reference output when the reference sensor is receiving the reference signal and the plurality of sensors are receiving the energy from the scene and the reference signal;

a third reference output when the plurality of sensors are receiving only the uniform signal energy; and a fourth reference output when the reference sensor is receiving the reference signal and the sensors are receiving the uniform signal energy and the reference signal.

17. The imaging array of claim 16 comprising a blocker for blocking from the reference sensor the energy from the scene.

18. The imaging array of claim 16 wherein each of the plurality of sensors and the reference sensor comprise a millimeter wave receiver.

19. The imaging array of claim 16 wherein the uniform energy source for providing uniform signal energy comprises a blackbody absorber.

20. The imaging array of claim 16 wherein the plurality of sensors comprise a mechanically scanned array.

21. The imaging array of claim 16 wherein the plurality of sensors comprise a staring array.

22. The imaging array of claim 16 further comprising a control to switch the reference signal on and off at a frequency above a knee frequency.

23. The imaging array of claim 16 wherein the imaging energy from the scene is relative to a scene temperature.

24. The imaging array of claim 16 wherein the reference signal energy is noise energy.

25. The imaging array of claim 16 wherein:

the switch for turning the transmission from the reference signal source on and off switches the reference signal energy between being off during the first time interval and being on during the second time interval at a frequency above a knee frequency; and the switch switches the reference signal energy between being off during the third time interval and being on during the fourth time interval at a frequency above the knee frequency.

* * * * *